United States Patent
Tyvoll et al.

(10) Patent No.: US 7,459,491 B2
(45) Date of Patent: Dec. 2, 2008

(54) PIGMENT DISPERSIONS THAT EXHIBIT VARIABLE PARTICLE SIZE OR VARIABLE VICOSITY

(75) Inventors: David Tyvoll, La Jolla, CA (US); Howard A. Doumaux, San Diego, CA (US); Anne M. Kelly-Rowley, San Diego, CA (US); Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 11/068,246

(22) Filed: Feb. 28, 2005

(65) Prior Publication Data

US 2006/0084720 A1 Apr. 20, 2006

Related U.S. Application Data (60) Provisional application No. 60/620,527, filed on Oct. 19, 2004.

(51) Int. Cl.
*C09D 11/00* (2006.01)
(52) U.S. Cl. ........................ 523/160; 523/161
(58) Field of Classification Search ................. 523/160, 523/161
See application file for complete search history.

(56) References Cited

U.S. PATENT DOCUMENTS

| | | | |
|---|---|---|---|
| 3,989,661 A | 11/1976 | Bondy | |
| 5,254,425 A | 10/1993 | Suzuki et al. | |
| 6,113,680 A | 9/2000 | Aoyama et al. | |
| 6,440,203 B2 | 8/2002 | Kato | |
| 2002/0049261 A1 | 4/2002 | Soga et al. | |
| 2002/0180854 A1 | 12/2002 | Sato et al. | |
| 2003/0027894 A1 | 2/2003 | Sato et al. | |
| 2003/0225185 A1 | 12/2003 | Akers et al. | |

FOREIGN PATENT DOCUMENTS

EP 1 333 068 A 8/2003

*Primary Examiner*—Edward J Cain

(57) ABSTRACT

An inkjet ink including a polymer-attached pigment formulated to exhibit a compact configuration and an elongated configuration, which provides the polymer-attached pigment with a variable particle size. The polymer-attached pigment may include a pigment having at least one polymer attached to its surface. The at least one polymer may be formed from a hydrophobic segment and a hydrophilic segment, where the hydrophilic segment is soluble in an aqueous environment and the hydrophobic segment is insoluble in the aqueous environment. The polymer-attached pigment may be dispersed in an ink vehicle to provide a low viscosity inkjet ink. The inkjet ink may optionally include at least one binder formed from a hydrophobic segment and two hydrophilic segments. A method of producing a printed image having good durability and gloss is also disclosed.

42 Claims, 3 Drawing Sheets

PIGMENT DISPERSIONS THAT EXHIBIT VARIABLE PARTICLE SIZE OR VARIABLE VICOSITY

CROSS REFERENCE TO RELATED APPLICATION

This application claims the benefit of U.S. provisional patent application Ser. No. 60/620,527, filed Oct. 19, 2004.

FIELD OF THE INVENTION

The present invention relates to a pigment dispersion for use in an inkjet ink and, more specifically, to a pigment dispersion having a variable particle size or variable viscosity.

BACKGROUND OF THE INVENTION

Inkjet printing is a nonimpact process of printing text or images by depositing inkjet ink on a print medium. The inkjet ink includes an aqueous-based ink vehicle and a colorant, such as a dye or a pigment. Dyes are more commonly used in inkjet inks because dyes are easily dissolved or solvated in the ink vehicle. However, images printed with dye-based inkjet inks are generally less waterfast, lightfast, and resistant to ozone.

In contrast, pigment-based inkjet inks provide printed images having improved waterfastness and lightfastness. While pigment-based inkjet inks have these desirable properties, the pigments are typically insoluble in the ink vehicle. The pigments form discrete particles that clump or agglomerate if they are not stabilized in the inkjet ink. To prevent the pigments from agglomerating or settling out of the ink vehicle, the pigments are uniformly dispersed in the inkjet ink and stabilized in the dispersed form until the inkjet ink is used for printing.

To form stable pigment dispersions, dispersants or surfactants are added to the ink vehicle. The dispersant is typically a polymer formed by polymerizing hydrophobic monomers, hydrophilic monomers, hydrophobic copolymers, and/or hydrophilic copolymers. The dispersant binds to a surface of the pigment, providing stability to the pigment dispersion. When printing is desired, the pigment is precipitated from the inkjet ink and onto the print medium by solvent evaporation. This process is enhanced by the presence of salts, acids, or polymers in the print medium. Inks that contain dispersants provide printed images with good durability and gloss. However, a large amount of the dispersant is needed to produce these desirable properties, which increases the viscosity of the inkjet ink prohibitively. This increase in viscosity reduces the usefulness of dispersants in inkjet inks because it affects the firing reliability and print quality of inkjet pens.

Alternatively, the pigment is stably dispersed in the inkjet ink by modifying the surface of the pigment to include covalent attachment of polymeric or organic groups. The surface-modified pigments are referred to in the art as "self-dispersed pigments" or "polymer-attached pigments." Using surface-modified pigments improves the formulation latitude of the inkjet ink and reduces the viscosity of the inkjet ink compared to the viscosity of inkjet inks that have dispersants. However, if the inkjet ink includes unbound polymeric or organic groups, these still undesirably contribute to, and increase, the viscosity of the inkjet ink.

It would be desirable to provide an inkjet ink that produces printed images that have good gloss and durability without increasing the viscosity of the inkjet ink.

BRIEF SUMMARY OF THE INVENTION

The present invention relates to an inkjet ink having a polymer-attached pigment that is dispersed in an ink vehicle. The polymer-attached pigment includes at least one polymer attached to a surface of a pigment. The at least one polymer may include at least one hydrophobic segment and at least one hydrophilic segment. The at least one hydrophobic segment may be attached to the pigment and the at least one hydrophilic segment may be attached to the hydrophobic segment. The inkjet ink may optionally include at least one binder formed from a hydrophobic segment and two hydrophilic segments.

The present invention also relates to a method of forming a printed image having improved gloss and durability. The method includes providing an inkjet ink having at least one polymer-attached pigment that is formulated to exhibit a compact configuration and an elongated configuration. The polymer-attached pigment includes at least one polymer attached to a surface of a pigment.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

A polymer-attached pigment formulated to exhibit a compact configuration and an elongated configuration is provided. The polymer-attached pigment exhibits the compact configuration or the elongated configuration depending on an environment to which the polymer-attached pigment is exposed. The polymer-attached pigment may be dispersed in an ink vehicle to provide a low viscosity inkjet ink. The polymer-attached pigment may include a pigment having at least one polymer attached to its surface. A first portion of the polymer may be soluble in an aqueous environment and a second portion of the polymer may be insoluble in the aqueous environment. The polymer-attached pigment may adopt the compact configuration when the polymer-attach pigment is exposed to the aqueous environment or may adopt the elongated configuration when the polymer-attached pigment is exposed to an organic-enriched environment.

The pigment used in the inkjet ink may be a conventional pigment for use in inkjet printing, such as carbon black, an organic pigment, a white inorganic pigment, or a colored inorganic pigment. The pigment may be a black pigment or a colored pigment, such as a blue, black, brown, cyan, green, white, violet, magenta, red, or yellow pigment. In addition, mixtures of colored pigments may be used in the inkjet ink, as well as mixtures of black and colored pigments. The inorganic pigment may include, but is not limited to, iron oxides, titanium oxides, zinc oxide, zinc sulphides, zinc chromate, zirconium oxide, iron blue, ultramarine blue, chromium oxide, ultramarine, cobalt blue, cobalt violet, silicon dioxide, nickel oxides, aluminium oxides, ferric ferrocyanide (Prussian blue), lead chromate, white lead, basic lead sulfate, cadmium yellow, chrome yellow, barium sulfate, calcium carbonate, calcium silicate, and manganese violet. In one particular embodiment, the pigment is a carbon black or an organic pigment.

The pigment may be a carbon black pigment, such as a channel black, a furnace black, or a lamp black. Examples of carbon blacks include those sold under the Regal®, Black Pearls®, Elftex®, Monarch®, Mogul®, and Vulcan® trademarks, which are available from Cabot Corporation (Boston, Mass.). The carbon black may include, but is not limited to, Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P. Other carbon blacks include, but are not limited to, Printex 40, Printex 80, Printex 300, Printex L, Printex U, Printex V, Special Black 4, Special Black 5, FW1, FW2, FW18, and FW200, which are available from Degussa Corporation (Ridgefield, N.J.); Raven 780, Raven 890, Raven 1020, Raven 1040, Raven 1255, Raven 1500, Raven 5000, Raven 5250, which are available from Colombian Chemical Corporation (Atlanta, Ga.); and MA100 and MA440, which are available from Mitsubishi Chemical Corporation (Tokyo, Japan).

Suitable classes of colored pigments include, but are not limited to, anthraquinones, phthalocyanine blues, phthalocyanine greens, diazos, monoazos, pyranthrones, perylenes, heterocyclic yellows, quinacridones, and (thio)indigoids. Examples of phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyranthrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 93, Pigment Yellow 151, Pigment Yellow 154, Pigment Yellow 155, Pigment Yellow 117, Pigment Yellow 128, Pigment Yellow 138, Pigment Yellow 109, Pigment Yellow 110, and Pigment Yellow 213. These pigments are commercially available in either powder or press cake form from a number of sources including, BASF Corp. (Mount Olive, N.J.), Engelhard Corp. (Iselin, N.J.), CIBA Corp. (Tarrytown, N.Y.), Clariant Corp. (Coventry, R.I.), or Sun Chemical Corp. (Cincinnati, Ohio).

The pigment may also include the Hostafine® series of pigments, such as Hostafine® Yellow GR, Hostafine® Yellow, Hostafine® Red FRLL, Hostafine® Rubine F6B, Hostafine® Blue 2G, Hostafine® Black T, and Hostafine® Black TS, which are available from Clariant GmbH (Muttenz, Switzerland); Normandy Magenta RD-2400 (Paul Uhlich), Paliogen Violet 5100 BASF Corp.), Paliogen® Violet 5890 (BASF Corp.), Permanent Violet VT2645 (Paul Uhlich), Heliogen Green L8730 (BASF Corp.), Argyle Green XP-111-S (Paul Uhlich), Brilliant Green Toner GR 0991 (Paul Uhlich), Heliogen® Blue L6900, L7020 (BASF Corp.), Heliogen® Blue D6840, D7080 (BASF Corp.), Sudan Blue OS (BASF Corp.), PV Fast Blue B2GO1 (American Clariant), Irgalite Blue BCA (Ciba), Paliogen® Blue 6470 (BASF Corp.), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF Corp.), Paliogen® Orange 3040 (BASF Corp.), Ortho Orange OR 2673 (Paul Uhlich), Paliogen® Yellow 152, 1560 (BASF Corp.), Lithol Fast Yellow 0991K (BASF Corp.), Paliotol Yellow 1840 (BASF Corp.), Novoperm® Red BN (Clariant), Novoperm® Yellow FG 1 (Clariant), Permanent Yellow YE 0305 (Paul Uhlich), Lumogen Yellow D0790 (BASF Corp.), Suco-Gelb L1250 (BASF Corp.), Suco-Yellow D1355 (BASF Corp.), Hostaperm® Pink E (American Clariant), Fanal Pink D4830 (BASF Corp.), Cinquasia Magenta (DuPont), Lithol Scarlet D3700 (BASF Corp.), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF Corp.), Bon Red C (Dominion Color Company), Royal Brilliant Red RD-8192 (Paul Uhlich), Oracet Pink RF (Ciba), Paliogen® Red 3871K (BASF Corp.), Paliogen® Red 3340 (BASF), and Lithol Fast Scarlet L4300 (BASF Corp.).

Figure 1:
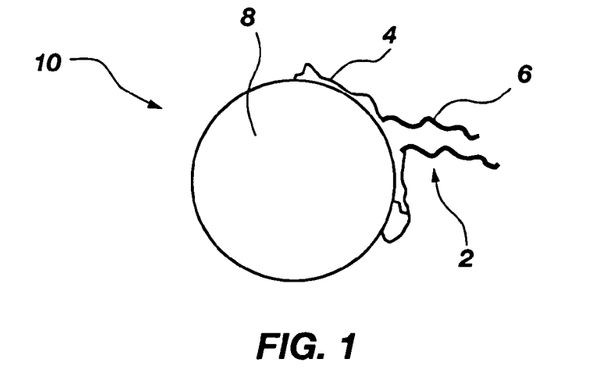
FIGS. 1-3 schematically illustrate an embodiment of a polymer-attached pigment of the present invention in a compact configuration.
Figure 2:
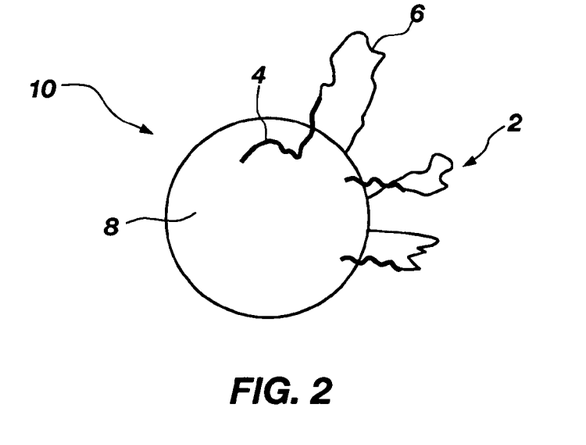
Figure 3:
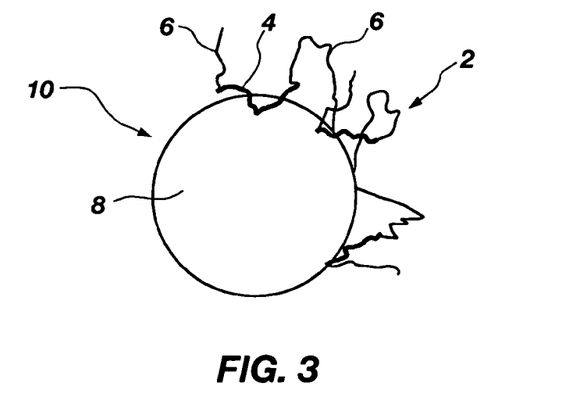

The polymer attached to the pigment may be formulated so that at least a first portion of the polymer is soluble in the ink vehicle and at least a second portion of the polymer is insoluble in the ink vehicle. The polymer 2 may be a random polymer or a block polymer and may include at least one hydrophobic segment 4 and at least one hydrophilic segment 6, as shown in FIGS. 1 and 2. The hydrophobic segment 4 may be attached to the pigment 8 and the hydrophilic segment 6 may be attached to the hydrophobic segment 4, as shown in FIG. 1. As such, the hydrophobic segment 4 may be closer than the hydrophilic segment 6 to the surface of the pigment 8 when the polymer 2 is in the elongated or extended configuration. For the sake of simplicity, two polymers 2 are shown attached to the pigment 8 in FIG. 1. However, it is understood that numerous polymers 2 may be attached to the pigment 8 to form the polymer-attached pigment 10. Alternatively, the hydrophilic segment 6 may be attached to the pigment 8 and the hydrophobic segment 4 may be attached to the hydrophilic segment 6, as shown in FIG. 2. The polymer 2 may also include more than two portions with each portion of the polymer 2 being either soluble or insoluble in the ink vehicle. For instance, a triblock copolymer 2 having one hydrophobic segment 4 and two hydrophilic segments 6 is shown in FIG. 3. The polymer 2 may also be formed from multiple blocks or segments that each includes hydrophobic monomers, hydrophilic monomers, or mixtures thereof. For instance, a hydrophobic block, formed from hydrophobic segments 4, may be attached to the pigment 8. A block having a mixture of hydrophobic segments 4 and hydrophilic segments 6 may be attached to the hydrophobic block. Similarly, a hydrophilic block, formed from hydrophilic segments 6, may be attached to the pigment 8. A block having a mixture of hydrophobic segments 4 and hydrophilic segments 6 may be attached to the hydrophilic block. The hydrophobic segments 4 and the hydrophilic segments 6 may be polymerized by conventional techniques to form the polymer 2.

Alternatively, the pigment 8 may have a plurality of different types of polymers 2 attached to its surface. For instance, the pigment 8 may include both hydrophobic polymers and hydrophilic polymers attached to its surface.

The hydrophobic segment 4 that may be used in the polymer 2 includes, but is not limited to, a styrene, an alkyl styrene, a phenoxyethylacrylate, an alkyl or aryl acrylate, an alkyl or aryl methacrylate, and a benzylmethacrylate. The hydrophilic segment 6 may include, but is not limited to, an acrylic acid, a methacrylic acid, an acrylamide, styrene-4-sulfonic acid, 4-vinylbenzoic acid, and alkylene oxide adducts of acrylic acid or methacrylic acid, such as hydroxyethylacrylate, hydroxyethylmethacrylate, or ethyl triethyleneglycol acrylate. The hydrophilic segment 6 may be an acid having a $pK_a$ of less than approximately 5, such as a sulfonate or phosphate adduct of acrylic acid or methacrylic acid. The hydrophilic segment may be cationic, such as dimethylaminoethylacrylate or its quaternized forms. Nonionic, anionic, or cationic functional groups may be present on the polymer 2 simultaneously, either within a polymer 2 or on separate polymers 2 attached to the same pigment. The hydrophobic segment 4 and the hydrophilic segment 6 may be present at varying ratios, as long as the amounts of the hydrophobic segment 4 and the hydrophilic segment 6 provide colloidal stability to the pigment dispersion.

The pigment 8 may include multiple sites on its surface to which the polymer 2 may attach. The polymer 2 may bond to some or all of the attachment sites to provide a desired degree of modification of the pigment 8. As shown in FIG. 1, the polymer 2 may be attached to the surface of the pigment 8 at one attachment site or may have multiple attachment sites to the pigment surface. The polymer-attached pigment 10 may include one type of polymer 2 attached to the pigment 8 or may include different types of polymers attached to the pigment 8. The polymer 2 may have a molecular weight ranging from approximately 1500 to less than approximately 50,000.

The polymer 2 may be chemically bonded to the pigment 8. In one particular embodiment, the polymer 2 is covalently bonded to the pigment 8. The polymer 2 may be attached to the pigment 8 using conventional techniques, such as by using a diazonium reaction. The polymer 2 may be formed by polymerizing the hydrophobic segment 4 and the hydrophilic segment 6. A diazonium salt of the polymer 2 may then be formed by conventional techniques and the polymer 2 reacted with the pigment 8 to form the polymer-attached pigment 10. Alternatively, a diazonium reaction may be used to covalently bond the hydrophobic segment 4 to the pigment 8. A Diels-Alder cycloaddition reaction may also be used to attach functional groups to surfaces of the pigment 8. Disulfide chemistry or thionyl chloride chemistry may also be used to attach functional groups to the surface of the pigment 8. The hydrophilic segment 6 may then be bonded to the hydrophobic segment 4 by a reaction that form is a covalent bond between the hydrophilic segment 6 and the hydrophobic segment 4, such as an $S_N2$ displacement reaction, a 1,2- or 1,4-addition reaction, a condensation reaction, an acylation reaction, or a ring-forming reaction.

A sufficient amount of the polymer 2 may be attached to the pigment 8 to disperse the polymer-attached pigment 10 in the ink vehicle. The pigment 8 may have from approximately 10% to approximately 70% of its surface area bound with the polymer 2. In one particular embodiment, from approximately 50% to approximately 70% of the surface area of the pigment 8 is bound with the polymer 2.

The polymer-attached pigment 10 may be present in the inkjet ink in an amount that provides a desired color, hue, and saturation when the polymer-attached pigment 10 is precipitated on a print medium, such as during printing. For instance, the polymer-attached pigment 10 may be present in the inkjet ink from approximately 0.25% by weight ("wt %") to approximately 15 wt % of a total weight of the inkjet ink. In one particular embodiment, the polymer-attached pigment 10 is present from approximately 1 wt % to approximately 10 wt % of the total weight of the inkjet ink.

The inkjet ink may also include the ink vehicle, which is a mixture of water and at least one water-soluble or water-miscible organic solvent. The inkjet ink may include from approximately 20 wt % to approximately 95 wt % of water based on the total weight of the inkjet ink. In one particular embodiment, the inkjet ink includes from approximately 70 wt % to approximately 95 wt % of water based on the total weight of the inkjet ink. The organic solvent may be present from approximately 0.5 wt % to approximately 25 wt % of the total weight of the inkjet ink.

The organic solvent may include, but is not limited to, 1,2-hexanediol; a polyhydric alcohol, such as ethylene glycol, diethylene glycol, triethylene glycol, polyethylene glycol, propylene glycol, polypropylene glycol, and glycerol; a polyhydric alcohol ether, such as ethylene glycol monomethyl ether, ethylene glycol monoethyl ether, ethylene glycol monobutyl ether, diethylene glycol monoethyl ether, diethylene glycol monobutyl ether, and ethylene glycol monophenyl ether; and a nitrogen-containing solvent, such as N-methyl-2-pyrrolidinone, 2-pyrrolidinone (2-P), a substituted pyrrolidinone, and triethanolamine. Monohydric alcohols, such as methanol, ethanol, and isopropyl alcohol may also be used in the inkjet ink. In one particular embodiment, the organic solvent in which the second portion of the polymer 2 is soluble has a higher boiling point than the boiling point of water.

At least one of the organic solvents in the inkjet ink may be an organic solvent in which at least a portion of the polymer 2 is poorly soluble. The organic solvent may include nitrogen-containing compounds, such as 2-pyrrolidone (2-P), N-methyl-pyrrolidinone (NMP), 1,3-dimethylimidazolid-2-one, and octyl-pyrrolidone; diols, such as ethanediols (e.g., 1,2-ethanediol), propanediols (e.g., 1,2-propanediol, 1,3-propanediol, 2-ethyl-2-hydroxymethyl-1,3-propanediol, ethylhydroxy-propanediol), butane-diols (e.g., 1,2-butanediol, 1,3-butanediol, 1,4-butanediol), pentanediols (e.g. 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); alcohols, such as $C_3$-$C_6$ alcohols (e.g., propanol, butanol, pentanol, and hexanol), including isomers thereof (e.g., 1-propanol and 2-propanol); glycol ethers and thioglycol ethers commonly employed in ink-jet inks, such as polyalkylene glycols such as polyethylene glycols (e.g., diethylene glycol (DEG), triethylene glycol, tetraethylene glycol), propylene glycols (e.g., dipropylene glycol, tripropylene glycol, tetrapropylene glycol); polymeric glycols (e.g., PEG 200, PEG 300, PEG 400, PPG 400); thiodiglycol; and mixtures thereof. Additional organic solvents include hydantoins (glycol ureas) and derivatives thereof, such as a hydantoin containing ethyl hydroxide and methyl groups, available from Lonza, Inc. as Dantocol DHE, and polyalkoxylated triols, such as Multranol 4012, which is a polyalkoxylated triol having a molecular weight of about 440, available from Bayer.

The organic solvent may be selected based on its solubility parameter, which is a convenient method of describing the organic solvent or mixtures of organic solvents that may be used in the present invention. Solubility parameters, such as the Hansen solubility parameters, are known to those of skill in the art. The Hansen solubility parameters are a three-parameter system that divides a total Hildebrand value into three parts: a dispersion force component a hydrogen bonding component, and a polar component according to the following formula:

$$\delta_t^2 = \delta_d^2 + \delta_p^2 + \delta_h^2$$

where $\delta_t^2$ is the Total Hildebrand parameter, $\delta_d^2$ is the dispersion component, $\delta_p^2$ is the polar component, and $\delta_h^2$ is the hydrogen bonding component. The Hansen solubility parameters are thus additive. By using the Hansen solubility parameter, organic solvents may be divided into weak, moderate, or strong hydrogen bonders. The organic solvent or mixture of organic solvents used in the inkjet ink may be a moderate or a strong hydrogen bonder. Out of the moderate hydrogen bonders, organic solvents and mixtures of organic solvents having a $\delta_t^2$ value ranging from approximately 10 to approximately 12 are preferred, such as ketones, esters, ethers, or glycol monoethers, but excluding water. Out of the strong hydrogen bonders, organic solvents and mixtures of organic solvents having a $\delta_t^2$ value ranging from approximately 11.5 to approximately 13.5 are especially preferred, such as alcohols, polyols, amines, acids, and amides. In one particular embodiment, the organic solvent is 1,2-hexanediol, ethylene glycol monophenyl ether, or mixtures thereof.

To further improve gloss and durability, the inkjet ink may optionally include at least one binder. If present in the inkjet ink, the binder may interact with the polymer 2 of the polymer-attached pigment 10. The binder may be formulated so that at least a first portion of the binder is soluble in the ink vehicle of the inkjet ink and at least a second portion of the binder is insoluble in the ink vehicle of the inkjet ink. The binder may interact with the polymer 2 of the polymer-attached pigment 10 by formulating the binder to exhibit a compact configuration in the aqueous environment and an elongated configuration in the organic-enriched environment.

Figure 7:
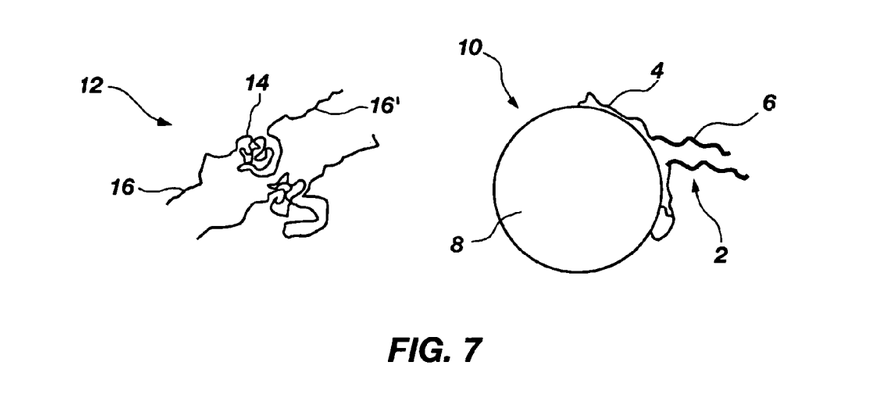
FIG. 7 schematically illustrates an embodiment of a binder and a polymer-attached pigment of the present invention in a compact configuration.

The binder may be a random polymer or a block polymer having a central hydrophobic portion and two adjacent hydrophilic portions. As shown in FIG. 7, the binder 12 may be a triblock copolymer that includes a hydrophobic segment 14 and two hydrophilic segments 16, 16' adjacent to each end of the hydrophobic segment 14. The hydrophobic segment 14 of the binder 12 may be selected from the list of hydrophobic segments 4 disclosed herein for use in the polymer 2 of the polymer-attached pigment 10. Each of the hydrophilic monomers that are used in the hydrophilic segments 16, 16' of the binder 12 may be independently selected from the list of hydrophilic segments 6 disclosed herein for use in the polymer 2 of the polymer-attached pigment 10. As such, each of the hydrophilic segments 16, 16' may be the same or different. The binder 12 may also include more than three portions with each portion of the binder 12 being either soluble or insoluble in the ink vehicle. The hydrophobic segment 14 and the hydrophilic segments 16, 16' may be polymerized by conventional techniques to form the binder 12. The binder 12 may be present in the inkjet ink in a range of from approximately 2 wt % to approximately 4 wt %.

Depending on the desired properties of the inkjet ink, the ink vehicle may optionally include additives or ingredients that are known in the art, such as surfactants, dispersants, pH adjusters, buffers, humectants, antioxidants, solubilizers, ultraviolet absorbers, anti-corrosion additives, anti-kogation additives, or biocides. For instance, the inkjet ink may optionally include a glycerin-modified short chain ethylene oxide dispersant, such as LEG-1, which is available from Lipo Chemical Co. (Paterson, N.J.).

The inkjet ink may be produced by dispersing the polymer-attached pigment 10 in the ink vehicle. The polymer-attached pigment 10 may be substantially homogenously dispersed in the inkjet ink using conventional techniques, such as ultrasonic energy or a media mill. The polymer-attached pigment 10 may be dispersed without using conventional dispersants. Any additional ingredients may be mixed and dissolved into the pigment dispersion using conventional techniques, such as by using a ball mill, a sand mill, a roll mix, an agitator mill, a Henschel mixer, a colloid mill, or an ultrasonic homogenizer. If the binder 12 is present in the inkjet ink, the binder 12 may be mixed and dissolved into the pigment dispersion using conventional techniques.

The inkjet ink of the present invention may be used in an inkjet printing process, such as a thermal, piezoelectric, drop-on-demand, or continuous inkjet printing process. To produce the printed image, the inkjet ink may be deposited on the print medium by conventional inkjet printing techniques, which are not described in detail herein. The print medium may be a conventional print medium known in the art, such as a plain or coated paper, an ink-jet photo-type paper, or an uncoated, substantially or completely nonporous media, such as billboard paper, vinyl, or PET.

Particles of the polymer-attached pigment 10 may have a variable particle size depending on an environment to which they are exposed. The dispersed pigment particles may have a small particle size in a substantially aqueous environment and a large particle size in an environment having a high organic solvent content, referred to herein as the "organic-enriched environment." The dispersed pigment particles may also provide a variable viscosity to the inkjet ink depending on the environment in which the polymer-attached pigment 10 is dispersed. If the environment is substantially aqueous, the dispersed pigment particles may provide a low viscosity to the inkjet ink. However, if the environment is enriched in organic solvents, the inkjet ink may have an increased viscosity.

The hydrophobic segment 4 and the hydrophilic segment 6 of the polymer 2 may provide the variable particle size to the polymer-attached pigment 10 and the corresponding variable viscosity. When the polymer-attached pigment 10 is in the aqueous environment, the polymer 2 may be in the compact configuration, as shown in FIGS. 1-3. Since the hydrophobic segment 4 is poorly soluble in the aqueous environment, the hydrophobic segment 4 may be collapsed on the surface of the pigment 8, as shown in FIG. 1. If the hydrophilic segment 6 is directly attached to the pigment 8, the hydrophobic segment 4 may be collapsed back onto the surface of the pigment 8, as shown in FIGS. 2 and 3. As such, the particle size of the polymer-attached pigment 10 may be small and compact. Since the polymer-attached pigment 10 is in the compact configuration when it is present in the inkjet ink formulation, the viscosity of the inkjet ink is reduced.

The polymer-attached pigment 10 may have an average particle size ranging from approximately 1 nm to approximately 300 nm in the aqueous environment. In one particular embodiment, the particle size of the polymer-attached pigment 10 is less than approximately 150 nm. The polymer 2 may exhibit the compact configuration when the polymer-attached pigment 10 is present in the aqueous based ink vehicle of the inkjet ink. The small particle size of the polymer-attached pigment 10 may provide a corresponding low viscosity to the inkjet ink. The viscosity of the inkjet ink may range from approximately 1 centipoise ("cP") to approximately 15 cP. This low viscosity may be obtained even though the amount of polymer 2 in the inkjet ink is effectively increased relative to the amount of dispersant in a conventional inkjet ink.

Figure 4:
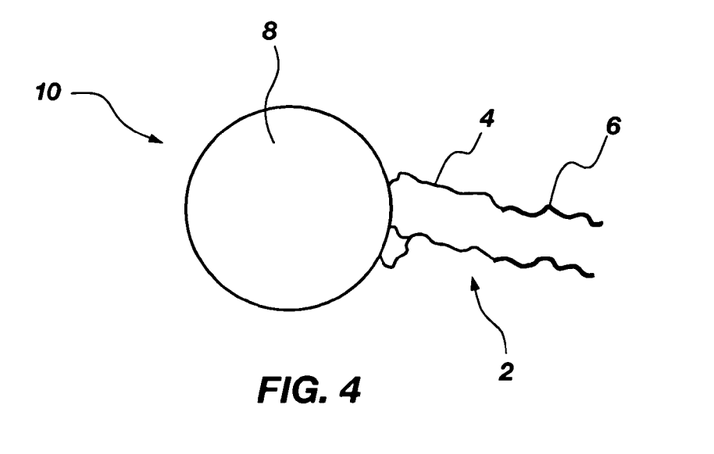
FIGS. 4-6 schematically illustrate an embodiment of a polymer-attached pigment of the present invention in an elongated configuration.
Figure 5:
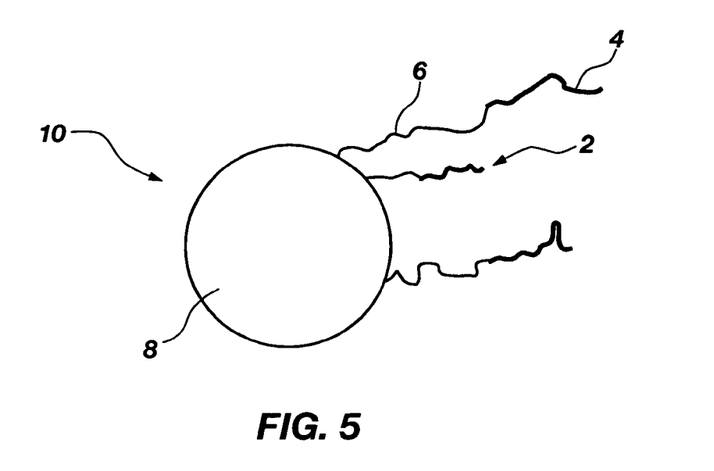
Figure 6:
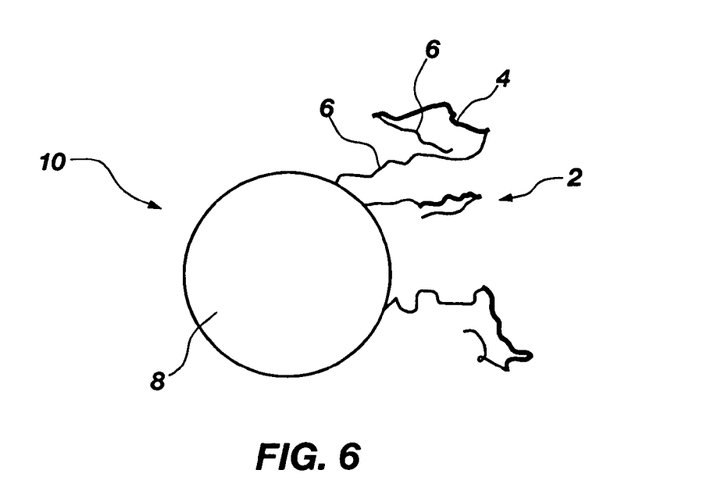

When the polymer-attached pigment 10 is in the organic-enriched environment, the polymer 2 may exhibit the elongated configuration shown in FIGS. 4-6. The organic-enriched environment may include an environment in which the concentration of the organic solvent in the ink vehicle has increased or a portion of the water in the ink vehicle has been removed. For instance, when the inkjet ink is deposited on the print medium to produce the printed image, the water in the ink vehicle may evaporate, producing the organic-enriched environment. As the water evaporates, the concentration of the organic solvent in the ink vehicle increases. For sake of example only, as the inkjet ink dries, the ink vehicle may include from approximately 50 wt % to approximately 90 wt % of the organic solvent, rather than from approximately 80 wt % to approximately 90 wt % water. As the concentration of the organic solvent increases, the hydrophobic segment 4 may become soluble in the organic-enriched environment of the ink vehicle, as shown in FIGS. 4-6. Therefore, the hydrophobic segment 4 may extend away from the surface of the pigment 8 and increase the particle size of the polymer-attached pigment 10. When the polymer 2 is in the elongated configuration, the particle size of the polymer-attached pigment 10 may increase by an amount ranging from approximately 5% to approximately 25%.

For instance, a radius of the pigment 8 may increase by up to approximately 100 Angstroms ("Å") when the polymer-attached pigment 10 is in the organic-enriched environment. For sake of example only, if the diameter of the pigment 8 is 10 nm, the particle size of the polymer-attached pigment 10 may increase in the organic enriched environment by up to approximately 100 Å, increasing the particle size of the polymer-attached pigment 10 to approximately 30 nm. Similarly, if the diameter of the pigment 8 is 300 nm, the particle size of the polymer attached pigment 10 may increase in the organic-enriched environment by up to approximately 100 Å, increasing the particle size of the polymer-attached pigment 10 to approximately 320 nm.

When the polymers 2 are elongated or extended, the polymers 2 attached to adjacent polymer-attached pigments 10 may become entangled and form a film over the printed image. Therefore, the printed image produced using the inkjet ink of the present invention may exhibit improved gloss and durability, such as improved resistance to smear, smudge, highlighter smudge, gasfade, or airfade.

The polymer 2 may also be configured to adopt the elongated configuration upon a change in temperature or pH. The temperature or pH change may alter the solubility of the polymer 2, causing the polymer 2 to extend into the elongated configuration. In this embodiment, the polymer 2 may include hydrophobic and hydrophilic segments 4,6 that exhibit conformation changes upon changes in temperature or pH. These types of polymers are known in the art and are not discussed in detail herein.

Figure 8:
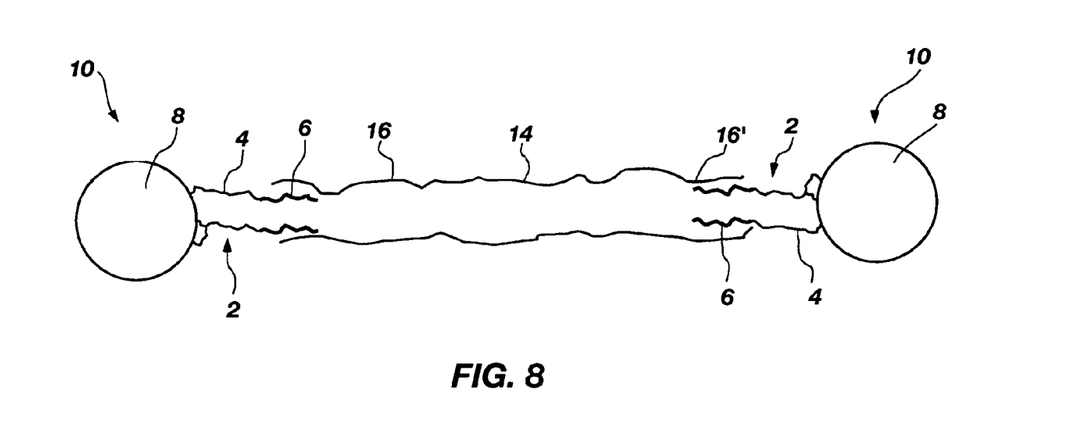
FIG. 8 schematically illustrates an embodiment of a binder and a polymer-attached pigment of the present invention in an elongated configuration.

The binder 12 may also exhibit a variable configuration depending on the environment to which the binder 12 is exposed. When the binder 12 is in the aqueous environment, the hydrophobic segment 14 may be curled up on itself, as shown in FIG. 7, because the hydrophobic segment 14 is poorly soluble in the aqueous environment. Therefore, the binder 12 may be in the compact configuration when the binder 12 is exposed to the aqueous environment, such as when the binder 12 is present in the inkjet ink formulation. When the binder 12 is exposed to the organic-enriched environment, such as when the inkjet ink is applied to the print medium and the water evaporates, the hydrophobic segment 14 may extend, as shown in FIG. 8, since the hydrophobic segment 14 is more soluble in the organic-enriched environment. As such, the binder 12 may be in the elongated configuration when the binder 12 is exposed to the organic-enriched environment. In the elongated configuration, the hydrophilic segments 16, 16' may repel the organic-enriched environment. By doing so, the hydrophilic segments 16, 16' may have increased interactions with the hydrophilic segments 16, 16' on other binders 12 in the inkjet ink or with the hydrophilic segment 6 on the pigment-attached polymer 10. These interactions between the binders 12 and between the binder 12 and the polymer 2 may cause the binders 12 and the polymer 2 to become entangled. As such, the binder 12 may contribute to the film formed over the printed image. Therefore, the printed image produced by the inkjet ink of the present invention may exhibit improved gloss and durability, such as improved resistance to smear, smudge, highlighter smudge, gasfade, or airfade.

Since the binder 12 is designed and tailored to interact with the polymer 2, interactions between the binder 12 and the polymer 2 may be statistically increased. Therefore, smaller amounts of the binder 12 may be used in the inkjet ink to achieve the desired improvement in gloss and durability.

In addition to interacting with the polymer-attached pigments 10 as described herein, the binder 12 may interact with conventional pigment dispersions. As such, the binder 12 may provide improved gloss and durability when used in inkjet inks that includes conventional pigment dispersions.

The following examples describe representative compositions of inkjet inks of the present invention that include the polymer-attached pigment 10. The examples are merely illustrative and are not meant to limit the scope of the present invention in any way.

EXAMPLES

Example 1

Inkjet Ink Compositions

Inkjet formulations including a polymer-attached pigment and organic solvents in which a portion of the polymer is soluble are prepared. The polymer and the organic solvents that are used in each of the inkjet formulations are shown in Table 1. The polymer is attached to carbon black as the pigment. The polymer is attached to a surface of the pigment by conventional techniques. The inkjet inks are formulated by conventional techniques.

TABLE 1

Formulations of Inkjet Inks.

| Formulation | Polymer (monomer/monomer) | Molecular weight of Polymer | Acid No. of Polymer | Organic solvents |
|---|---|---|---|---|
| 1 | styrene/acrylic acid | 6000 | 170 | 5% 2-P, 4% 1,2-hexanediol, 3% DEG, 3% LEG-1 |
| 2 | styrene/methacrylic acid | 10000 | 160 | 5% 2-P, 5% 1,2-hexanediol, 2% Dowanol EPh, 3% LEG-1 |

TABLE 1-continued

Formulations of Inkjet Inks.

| Formulation | Polymer (monomer/monomer) | Molecular weight of Polymer | Acid No. of Polymer | Organic solvents |
|---|---|---|---|---|
| 3 | styrene/phenoxyethyl-acrylate/methacrylic acid | 15000 | 180 | 4% 2-P, 5% 1,2-hexanediol, 3% Dowanol EPh, 3% LEG-1 |
| 4 | benzylmethacrylate/ methacrylic acid | 15000 | 140 | 5% 2-P, 5% 1,2-hexanediol, 5% tetraethylene glycol, 3% LEG-1 |
| 5 | styrene/methoxy polyethylene glycol (550) methacrylate | 12000/ 4000 | | 5% 2-P, 5% 1,2-hexanediol, 5% tetraethylene glycol, 3% LEG-1 |
| 6 | benzylmethacrylate/ methoxy polyethylene glycol (550) methacrylate/ methacrylic acid | 20000 | 70 | 5% 2-P, 5% 1,2-hexanediol, 5% tetraethylene glycol, 3% LEG-1 |
| 7 | styrene/ methylmethacrylate/ acrylic acid | 10000 | 150 | 5% 2-P, 5% 1,2-hexanediol, 3% ethylene glycol, 3% LEG-1 |
| 8 | styrene/butylacrylate/ methacrylic acid; styrene:butylacrylate = 2:1 | 10000 | 150 | 8% 1,2-hexanediol, 3% 2-P, 3% LEG-1 |

Example 2

Production of Printed Image

A test plot is printed on a print medium using a Hewlett-Packard Deskjet 970 inkjet printer and the inkjet inks described in Example 1. The printed images will exhibit improved gloss and improved resistance to smear, smudge, highlighter smudge, and gasfade or airfade compared to an image printed with an inkjet ink including a conventional self-dispersed pigment.

What is claimed is:

1. An inkjet ink, comprising:
a polymer-attached pigment dispersed in an ink vehicle, the polymer attached pigment including at least one polymer attached to a surface of a pigment, wherein at least a first portion of the at least one polymer is soluble in an organic solvent and at least a second portion of the at least one polymer is insoluble in the organic solvent, wherein the at least one polymer is covalently bonded to from approximately 10% to approximately 70% of a surface area of the pigment.

2. The inkjet ink of claim 1, wherein the at least a first portion of the at least one polymer is soluble in an aqueous environment and the at least a second portion of the at least one polymer is insoluble in the aqueous environment.

3. The inkjet ink of claim 1, wherein the pigment is a carbon black or an organic pigment.

4. The inkjet ink of claim 1, wherein the polymer-attached pigment is present in the inkjet ink in an amount ranging from approximately 0.25% by weight of a total weight of the inkjet ink to approximately 15% by weight of a total weight of the inkjet ink.

5. The inkjet ink of claim 1, wherein the at least one polymer has a molecular weight ranging from approximately 1500 to less than approximately 50,000.

6. The inkjet ink of claim 1, wherein the at least one polymer comprises at least one hydrophilic segment selected from the group consisting of an acrylic acid, a methacrylic acid, an acrylamide, styrene-4-sulfonic acid, 4-vinylbenzoic acid, and alkylene oxide adducts of acrylic acid or methacrylic acid.

7. The inkjet ink of claim 1, wherein the at least one polymer comprises at least one hydrophobic segment selected from the group consisting of a styrene, an alkyl styrene, a phenoxyethylacrylate, an alkyl or aryl acrylate, an alkyl or aryl methacrylate, and a benzylmethacrylate and at least one hydrophilic segment.

8. The inkjet ink of claim 1, wherein the organic solvent comprises 1,2-hexanediol, ethylene glycol monophenyl ether, or mixtures thereof.

9. The inkjet ink of claim 1, wherein the organic solvent comprises an organic solvent having a boiling point higher than a boiling point of water.

10. The inkjet ink of claim 1, wherein the polymer-attached pigment is homogenously dispersed in the inkjet ink.

11. The inkjet ink of claim 1, wherein the polymer-attached pigment is formulated to exhibit a compact configuration in an aqueous environment.

12. The inkjet ink of claim 1, wherein the polymer-attached pigment has an average particle size ranging from approximately 1 nm to approximately 300 nm in the compact configuration.

13. The inkjet ink of claim 1, wherein the polymer-attached pigment is formulated to exhibit an elongated configuration in an organic-enriched environment.

14. The inkjet ink of claim 1, wherein the polymer-attached pigment is formulated to have a variable particle size and a variable viscosity.

15. An inkjet ink, comprising:
a polymer-attached pigment dispersed in an ink vehicle, the polymer attached pigment comprising at least one polymer attached to a surface of a pigment, wherein at least a first portion of the at least one polymer is soluble in an organic solvent and at least a second portion of the at least one polymer is insoluble in the organic solvent, wherein the polymer-attached pigment is formulated to have an average particle size in an elongated configuration that is from approximately 5% to approximately 25% larger than the average particle size in a compact configuration.

16. An inkjet ink, comprising:
a polymer-attached pigment dispersed in an ink vehicle, the polymer attached pigment including at least one polymer attached to a surface of a pigment, wherein at least a first portion of the at least one polymer is soluble in an organic solvent and at least a second portion of the at least one polymer is insoluble in the organic solvent: and
at least one polymeric binder including a hydrophobic segment and two hydrophilic segments.

17. The inkjet ink of claim 16, wherein the hydrophobic segment is selected from the group consisting of a styrene, an alkyl styrene, a phenoxyethylacrylate, an alkyl or aryl acrylate, an alkyl or aryl methacrylate, and a benzyl methacrylate.

18. The inkjet ink of claim 16, wherein each of the two hydrophilic segments is independently selected from the group consisting of an acrylic acid, a methacrylic acid, an acrylamide, styrene-4-sulfonic acid, 4-vinylbenzoic acid, and alkylene oxide adducts of acrylic acid or methacrylic acid.

19. An inkjet ink, comprising:
a polymer-attached pigment dispersed in an ink vehicle, the polymer attached pigment comprising at least one hydrophobic segment and at least one hydrophilic segment attached to a surface of a pigment, wherein the at least one hydrophobic segment is soluble in an organic solvent of the ink vehicle and the at least one hydrophilic segment is insoluble in the organic solvent, and wherein an average particle size of the polymer-attached pigment in an elongated configuration is from approximately 5% to approximately 25% larger than the polymer-attached pigment in a compact configuration.

20. The inkjet ink of claim 19, wherein the at least one hydrophobic segment is attached to the pigment and the at least one hydrophilic segment is attached to the at least one hydrophobic segment.

21. The inkjet ink of claim 19, wherein the at least one hydrophilic segment is soluble in an aqueous environment and the at least one hydrophobic segment is insoluble in the aqueous environment.

22. An inkjet ink, comprising:
a polymer-attached pigment dispersed in an ink vehicle, the polymer attached pigment comprising at least one hydrophobic segment and at least one hydrophilic segment attached to a surface of a pigment, wherein the at least one hydrophobic segment is soluble in an organic solvent of the ink vehicle and the at least one hydrophilic segment is insoluble in the organic solvent; and
at least one polymeric binder comprising a hydrophobic segment and two hydrophilic segments.

23. The inkjet ink of claim 22, wherein the hydrophobic segment of the polymeric binder is selected from the group consisting of a styrene, an alkyl styrene, a phenoxyethylacrylate, an alkyl or aryl acrylate, an alkyl or aryl methacrylate, and a benzylmethacrylate.

24. The inkjet ink of claim 22, wherein each of the two hydrophilic segments is independently selected from the group consisting of an acrylic acid, a methacrylic acid, an acrylamide, styrene-4-sulfonic acid, 4-vinylbenzoic acid, and alkylene oxide adducts of acrylic acid or methacrylic acid.

25. A method of printing an image having good durability and gloss, comprising:
providing an inkjet ink comprising at least one polymer-attached pigment, the polymer-attached pigment formulated to exhibit a compact configuration and an elongated configuration, wherein at least a first portion of the at least one polymer is soluble in an organic solvent and at least a second portion of the at least one polymer is insoluble in the organic solvent;
depositing the inkjet ink on a print medium; and
subjecting the inkjet ink to an organic-enriched environment.

26. The method of claim 25, wherein providing the inkjet ink comprising the at least one polymer-attached pigment comprises providing the inkjet ink comprising the at least one polymer covalently bonded to a surface of the pigment.

27. The method of claim 25, wherein providing the inkjet ink comprising the at least one polymer-attached pigment comprises providing the inkjet ink comprising the at least one polymer attached to a surface of the pigment.

28. The method of claim 27, wherein providing the inkjet ink comprising the at least one polymer attached to the surface of the pigment comprises providing at least one polymer comprising at least one hydrophobic segment and at least one hydrophilic segment.

29. The method of claim 27, wherein providing the inkjet ink comprising the at least one polymer attached to the surface of the pigment comprises providing at least one hydrophobic segment and at least one hydrophilic segment selected from the group consisting of an acrylic acid, a methacrylic acid, an acrylamide, styrene-4-sulfonic acid, 4-vinylbenzoic acid, and alkylene oxide adducts of acrylic acid or methacrylic acid.

30. The method of claim 27, wherein providing the inkjet ink comprising the at least one polymer attached to the surface of the pigment comprises providing at least one hydrophobic segment selected from the group consisting of styrene, an alkyl styrene, a phenoxyethylacrylate, an alkyl or aryl acrylate, an alkyl or aryl methacrylate, and a benzylmethacrylate and at least one hydrophilic segment.

31. The method of claim 27, wherein providing the inkjet ink comprising the at least one polymer attached to the surface of the pigment comprises providing the inkjet ink comprising at least one hydrophobic segment attached to the surface of the pigment and at least one hydrophilic segment attached to the at least one hydrophobic segment.

32. The method of claim 25, wherein providing the inkjet ink comprising the at least one polymer-attached pigment comprises providing the at least one polymer-attached pigment in the compact configuration.

33. The method of claim 25, wherein providing the inkjet ink comprising the at least one polymer-attached pigment comprises providing at least one polymer-attached pigment having a particle size ranging from approximately 1 nm to approximately 300 nm.

34. The method of claim 25, further comprising adding at least one polymeric binder comprising a hydrophobic segment and two hydrophilic segments to the inkjet ink.

35. The method of claim 34, wherein the hydrophobic segment is selected from the group consisting of a styrene, an alkyl styrene, a phenoxyethylacrylate, an alkyl or aryl acrylate, an alkyl or aryl methacrylate, and a benzylmethacrylate.

36. The method of claim 34, wherein each of the two hydrophilic segments is independently selected from the group consisting of an acrylic acid, a methacrylic acid, an acrylamide, styrene-4-sulfonic acid, 4-vinylbenzoic acid, and alkylene oxide adducts of acrylic acid or methacrylic acid.

37. The method of claim 25, wherein subjecting the inkjet ink to the organic-enriched environment comprises converting the compact configuration of the polymer-attached pigment to the elongated configuration.

38. The method of claim 25, wherein subjecting the inkjet ink to the organic-enriched environment comprises increasing an average particle size of the polymer-attached pigment by from approximately 5% to approximately 25% relative to an average particle size of the polymer-attached pigment in the compact configuration.

39. The method of claim 28, wherein subjecting the inkjet ink to the organic-enriched environment comprises solubilizing the at least one hydrophobic segment in the organic-enriched environment.

40. The method of claim 25, wherein subjecting the inkjet ink to the organic-enriched environment comprises increasing a concentration of the organic solvent in the inkjet ink.

41. The method of claim 25, wherein subjecting the inkjet ink to the organic-enriched environment comprises removing at least a portion of water from the inkjet ink.

42. The method of claim 25, wherein subjecting the inkjet ink to the organic-enriched environment comprises entangling the at least one polymer to form a film.

* * * * *

UNITED STATES PATENT AND TRADEMARK OFFICE
CERTIFICATE OF CORRECTION

PATENT NO. : 7,459,491 B2
APPLICATION NO. : 11/068246
DATED : December 2, 2008
INVENTOR(S) : David Tyvoll et al.

Page 1 of 1

It is certified that error appears in the above-identified patent and that said Letters Patent is hereby corrected as shown below:

Title page, Item (54), in "Title", line 3, delete "VICOSITY" and insert -- VISCOSITY --, therefor.

In column 1, line 3, delete "VICOSITY" and insert -- VISCOSITY --, therefor.

In column 2, line 58, delete "polymer-attach" and insert -- polymer-attached --, therefor.

In column 5, line 56, delete "form is" and insert -- forms --, therefor.

Signed and Sealed this

Twenty-second Day of June, 2010

David J. Kappos
*Director of the United States Patent and Trademark Office*